March 10, 1953  G. V. HALL ET AL  2,631,182

INDICATING VENT PLUG CONSTRUCTION

Filed Aug. 26, 1948

INVENTORS.
GARDNER V. HALL,
McCONNELL SHANK
AND ADOLPH F. KRAUSS.
BY Allen & Allen
ATTORNEYS.

Patented Mar. 10, 1953

2,631,182

UNITED STATES PATENT OFFICE 2,631,182

INDICATING VENT PLUG CONSTRUCTION

Gardner V. Hall, Des Moines, Iowa, and McConnell Shank, Oak Park, and Adolph F. Krauss, River Forest, Ill.; said McConnell Shank and said Adolph F. Krauss assignors to The Richardson Company, Lockland, Ohio, a corporation of Ohio Application August 26, 1948, Serial No. 46,344

10 Claims. (Cl. 136—182)

Our invention has to do with the provision of vent plugs or filler plugs for the cell covers of storage battery cases. These plugs close the filler openings of the cell covers and also serve as means whereby any gases generated within the cells of the storage battery can escape to the outer air. It has hitherto been suggested that vent plugs might be made in such a way as to give an indication of the conditions within the storage battery cell, principally the height of the electrolyte therein, so that it might be determined whether the cell needed filling without the necessity of removing the vent plug. However, those vent plugs designed with a float apparatus to give an external indication of electrolyte level have hitherto been cumbersome and expensive in construction, and liable to mechanical failure such as sticking in action. Other types of vent plug involving a transparent cover and a tubular extension passing downwardly to and below normal electrolyte level have not been fully satisfactory because the indications they gave were not readily readable. Storage batteries for automotive work are not generally located in positions where they are subjected to strong top light; and relatively faint indicia located at the bottom of a tube extending into the dark interior of a storage battery cell have generally been quite difficult to observe.

A primary object of the present invention is the provision of an indicating vent plug in which the indication of battery condition is positive and unmistakable under conditions of semi-darkness; and in this connection it is our object to provide an indicating vent plug in which the differing indications of battery condition are completely dissimilar and cannot be mistaken one for another.

It is an object of this invention to provide an indicating vent plug of simple and sturdy construction, which is economical to make, which is not liable to get out of order in use, and which is not subject to mechanical defect and breakage.

While our device in its simplest form is designed to give an indication of proper electrolyte level in the cell, ancillary objects of our invention have to do with the provision of an indicating vent plug which also will indicate the electrical and chemical condition of the storage battery, all without removal of the vent plug, and by external examination only.

Yet another object of our invention is the provision of an indicating vent plug which is as simple to use as an ordinary non-indicating vent plug and which may be employed with non-overfill devices and the like.

These and other objects of the invention which will be set forth hereinafter or will be apparent to one skilled in the art upon reading this specification, we accomplish by that construction and arrangement of parts of which we shall now describe an exemplary embodiment. Reference is made to the accompanying drawings wherein.

Briefly, in the practice of our invention we provide a vent plug having a transparent top, and a tubular extension passing downwardly to and below the desired normal electrolyte level. At or slightly above the normal desired electrolyte level we provide a lens of extremely short focal length. The tubular extension passes downwardly beyond this lens, is closed on the bottom by a suitable plug or closure member, is provided with openings whereby the electrolyte can enter it, and contains a float member, conveniently in the form of a free ball of light colored substance of suitable specific gravity. When the electrolyte level is at or above the level of the lens, the float ball is floated upwardly into contact or substantial contact with the lens. In this position the image of the ball is readily visible through the lens and usually fills substantially all if not all of the visible area of the lens. As soon however as the level of the electrolyte falls so as to remove the ball a very short distance from the lens, the image of the ball completely disappears, and the tube becomes dark. In other words, the focal length of the lens is so short that when the ball is slightly removed from its surface any light reflected by the ball is dissipated by the lens before reaching the eye of the observer.

Thus, if the electrolyte level is such as to maintain the ball in contact or nearly in contact with the under surface of the lens, the tubular extension of our vent plug appears as though closed by a white or light colored disc at substantially the electrolyte level, while if the electrolyte level has fallen so as to remove the ball from the lens, the tubular extension appears black. The two signals are unmistakable and are readily observable in very poor light.

It is further readily possible in our construction to provide a vent plug which will give an indication of the electrical and chemical condition of the storage battery. This may be accomplished in various ways.

One way is to form the float ball of a material of such density or gravity that it will float in the electrolyte only if the cell is charged to a certain percentage of capacity. Yet another way is to employ in the tube below the lens two or more balls of differing specific gravity, which may readily be done if the individual balls have diameters less than half the internal diameter of the tubular extension. One ball can be formed with such density that it will always float in the electrolyte to give the indication of electrolyte level described above. Another ball, of a contrasting color, can be made of such density as to float in the electrolyte only if the cell is charged to a particular degree.

Figure 1:
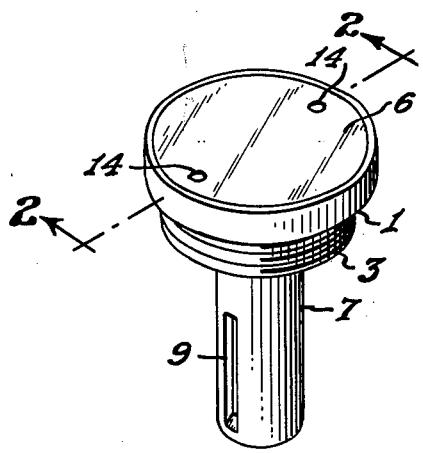
Figure 1 is a perspective view of our indicating vent plug in its preferred form.
Figure 2:
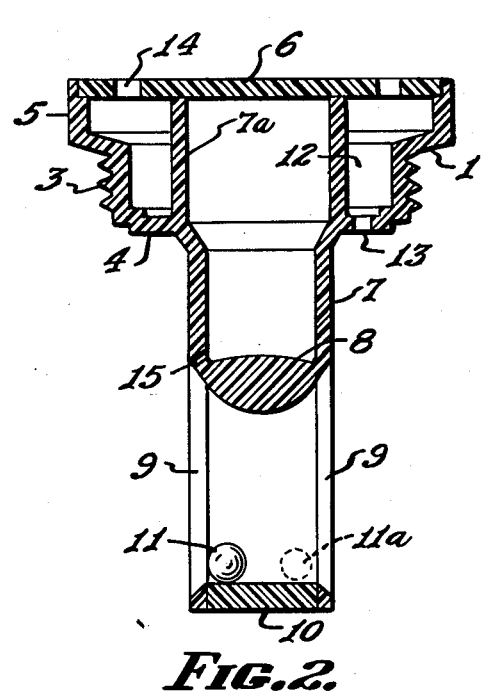
Figure 2 is a longitudinal view thereof taken along the section line 2—2 of Figure 1.
Figure 3:
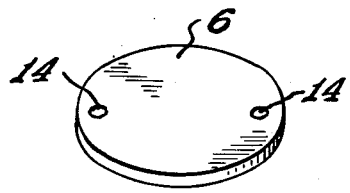
Figure 3 is a plan view of a cap member.
Figure 4:
Figure 4 is a plan view of an end closure member.

Coming now to the preferred physical form of our indicating vent plug, we have illustrated, as will be clearest from Figure 2 a hollow structure having a body 1. The body has a threaded shank 3 adapted to be turned into the filler well opening of a cell cover. The shank terminates downwardly in an annular shoulder 4. Above the shank there is an annular extension 5 which forms the means by which the vent plug may be grasped for turning into and out of the filler well opening. The annular shoulder 5 may be knurled or otherwise treated for ready grasping.

The top of the body is closed by a transparent disc 6, let into an annular groove or recess in the shoulder 5. The body is provided with a downward tubular extension 7 of lesser outside diameter than the threaded shank 3, and preferably terminating in an upward extension 7a within the body which extension comes into contact with the underside of the transparent cover 6. The tubular downward extension 7 is so dimensioned as to pass to and below the desired normal electrolyte level in the cell with which the vent plug is to be used. At a point which is substantially at the normal or desired level of electrolyte we provide a lens 8. The indicated curvature of the surfaces of this lens show that it is of very short focal length. Its focal length should be substantially shorter than the length of the extension 7 which lies below the lens.

The portion of the extension 7 lying below the lens is provided with slots or perforations 9 to permit the electrolyte to enter it. Its lower end is closed by a plug member 10. It contains one or more of the ball elements 11, 11a, referred to above, the size of these elements being such that they will not pass through the slots 9.

About the upper extension 7a of the tube 7 there is an annular recess 12 formed in the body. The shoulder 4 is provided with one or more perforations 13 for the passage of gas. These perforations will be located above maximum electrolyte level. The cover member 6 is also provided with one or more perforations 14, preferably out of vertical register with the perforations 13 in the shoulder, so that the structure acts as a trap for any droplets of electrolyte entrained in the escaping gases. The tube 7 may be provided with a drainage opening 15 to drain electrolyte or condensate from above the lens.

The structure which we have described may be formed in various ways. The parts may all be assembled and held together by cementing, interengagement or threading. The cover 6 will preferably be formed separately and held in place either by a press fit or by cementing or threading. Where it is desired to have the body of the device formed of a material like hard rubber which has greater stability than some of the transparent plastics, it is within the scope of our invention to mold the body, comprising elements 3, 4 and 5, of hard rubber and separately mold the tube 7 of a transparent plastic. The lens 8 may be separately formed and held in place within the tubular extension 7 by cementing or otherwise; and it may rest upon a molded ledge therein. The lower end of the tubular extension 7 is preferably closed by a separately formed plug 10 held in place by a press fit, by cementing, or both.

For economy, we prefer in practice to make our indicating vent plug of three parts. The cover member 6 and the plug 10 are separately formed by molding or cutting. The remaining elements are integral, and are formed in a suitably cored mold from a transparent plastic such as polystyrene or any other transparent plastic having reasonable dimensionable stability, and resistant to storage battery electrolyte. In our preferred form of manufacture the lens 8 is molded from the transparent plastic and is integral with the tube 7, its upper and lower surfaces being formed by the curved surfaces of mold core elements as will be readily understood. It will be obvious that the lens need not have surfaces which are optically accurate. The slots 9 in the lower part of the tubular extension 7 may be molded by movable cores, or may be cut into the molded structure by milling cutters or the like. Our vent plug is such that it may be used with known non-overfill devices, such as the non-overfill device of the Keller Patent No. 2,233,081.

Modifications may be made in our invention without departing from the spirit of it. Having thus described our invention in an exemplary embodiment, what we claim as new and desire to secure by Letters Patent is:

1. An indicating vent plug having a body with a tubular extension passing downwardly therefrom to and below normal electrolyte level in a storage battery cell, a short focal length lens intermediate the ends of said tubular extension, and a floating member located in said tubular extension below said lens, said lens being so positioned that the electrolyte at normal level will float said floating member into substantial contact with the surface of said lens, whereby said member becomes visible therethrough, the portion of said tubular extension below said lens being of greater length than the focal length of said lens, whereby upon dropping of the electrolyte level, said floating member may be located at a distance from said lens greater than the focal length thereof.

2. An indicating vent plug having a body with a tubular extension passing downwardly therethrough to and below normal electrolyte level in a storage battery cell, a short focal length lens intermediate the ends of said tubular extension, a floating member located in said tubular extension below said lens, said lens being so positioned that the electrolyte at normal level will float said floating member into substantial contact with the surface of said lens so that said member becomes visible therethrough, said tubular extension below said lens being of greater length than the focal length of said lens so that upon dropping of the electrolyte level said float member may be located at a distance from said lens greater than the focal length thereof, the lower end of said tubular extension being closed to retain said floating member, the portion of said tubular extension below said lens having openings therein to permit the electrolyte to enter.

3. The structure claimed in claim 2 wherein said lens and tube are an integral molding of transparent plastic.

4. The structure claimed in claim 2 in which said floating member has a gravity less than the gravity of storage battery electrolyte only when the storage battery has a predetermined degree of charge.

5. The structure claimed in claim 2 wherein said body has a transparent cover.

6. The structure claimed in claim 2 wherein said body has a transparent cover and wherein said body has an upper grasping annulus, and a lower threaded shank of smaller dimensions terminating downwardly in an annular shoulder, and wherein said shoulder and said cover are perforated for the passage of gases.

7. The structure claimed in claim 2 wherein said body has a transparent cover and wherein said body has an upper grasping annulus, and a lower threaded shank of smaller dimensions terminating downwardly in an annular shoulder, and wherein said shoulder and said cover are perforated for the passage of gas and wherein said tubular downward extension has an upper extension within the hollow of said body and substantially contacting said cover whereby to confine said gases to an annular space surrounding said upper extension.

8. The structure claimed in claim 2 wherein said body has a transparent cover and wherein said body has an upper grasping annulus, and a lower threaded shank of smaller dimensions terminating downwardly in an annular shoulder, and wherein said shoulder and said cover are perforated for the passage of gas and wherein said tubular downward extension has an upper extension within the hollow of said body and substantially contacting said cover whereby to confine said gases to an annular space surrounding said upper extension, said floating member having a gravity such as to cause it to float in electrolyte at all stages of charge of an electric storage battery, there being in said portion another floating member having a gravity such as to float only when said battery has a predetermined degree of charge, said floating members being of light contrasting colors, readily distinguishable from each other.

9. In a vent plug for indicating the electrolyte level in storage batteries, a lens of short focal length mounted so as to be above the normal electrolyte level of the storage battery, and an indicating member arranged to float in said electrolyte, said lens being so positioned that electrolyte at normal level will cause the indicating member to float substantially in contact with said lens and hence within the focal length thereof, whereby said indicating member will be visible when viewed through said lens, and upon dropping of the electrolyte level said indicating member will be located at a distance from said lens greater than the focal length thereof and hence invisible through said lens, thus indicating that the battery is in need of additional electrolyte.

10. An indicating vent plug having a body with a tubular extension passing downwardly therefrom to and below normal electrolyte level in a storage battery cell, a short focal length lens intermediate the ends of said tubular extension, and a floating member located in said tubular extension below said lens, said lens being so positioned that the electrolyte at normal level will cause the float member to float within the focal length of said lens, whereby said float member will be clearly visible when viewed through said lens, the portion of said tubular extension below said lens being of a greater length than the focal length of said lens, whereby upon dropping of the electrolyte level, said floating member may be located at a distance from said lens greater than the focal length thereof.

GARDNER V. HALL.
McCONNELL SHANK.
ADOLPH F. KRAUSS.

REFERENCES CITED

The following references are of record in the file of this patent:

UNITED STATES PATENTS

| Number | Name | Date |
| --- | --- | --- |
| 461,370 | Seidensticker | Oct. 13, 1891 |
| 954,423 | Cramer | Apr. 12, 1910 |
| 1,581,717 | Bowen | Apr. 20, 1926 |
| 1,883,971 | Kryzanowsky | Oct. 25, 1932 |
| 1,978,449 | Codney | Oct. 30, 1934 |
| 1,991,192 | Bucky | Feb. 12, 1935 |
| 2,141,079 | Bolich | Dec. 20, 1938 |
| 2,469,560 | Jutte | May 10, 1949 |

FOREIGN PATENTS

| Number | Country | Date |
| --- | --- | --- |
| 118,834 | Australia | Aug. 31, 1944 |

OTHER REFERENCES

Modern Plastics, March 1948, page 98.